(12) United States Patent
Giua

(10) Patent No.: US 9,259,119 B2
(45) Date of Patent: Feb. 16, 2016

(54) SYSTEM FOR MONITORING AND CONTROLLING MODES OF OPERATION OF A MACHINE FOR PREPARING BEVERAGES, IN PARTICULAR COFFEE, BY MEANS OF CARTRIDGES OR CAPSULES

(75) Inventor: Alberto Federico Giua, Gallarte (IT)

(73) Assignee: LUIGI LAVAZZA S.P.A., Turin (IT)

( * ) Notice: Subject to any disclaimer, the term of this patent is extended or adjusted under 35 U.S.C. 154(b) by 254 days.

(21) Appl. No.: 13/882,915

(22) PCT Filed: Nov. 4, 2011

(86) PCT No.: PCT/IB2011/054924
§ 371 (c)(1),
(2), (4) Date: May 1, 2013

(87) PCT Pub. No.: WO2010/059892
PCT Pub. Date: May 10, 2012

(65) Prior Publication Data
US 2013/0220134 A1  Aug. 29, 2013

(30) Foreign Application Priority Data
Nov. 5, 2010 (IT) ............... TO2010A0881

(51) Int. Cl.
*A47J 31/00* (2006.01)
*A47J 31/40* (2006.01)
(Continued)

(52) U.S. Cl.
CPC ............ *A47J 31/407* (2013.01); *A47J 31/3676* (2013.01); *A47J 31/52* (2013.01); *A47J 31/56* (2013.01)

(58) Field of Classification Search
CPC ......... A47J 31/56; A47J 31/52; A47J 31/542; A47J 31/58
USPC .............................. 99/283, 280, 282, 281, 295
See application file for complete search history.

(56) References Cited

U.S. PATENT DOCUMENTS 5,551,331 A * 9/1996 Pfeifer et al. .................... 99/280
5,619,902 A * 4/1997 Schotte ........................... 99/281

(Continued)

FOREIGN PATENT DOCUMENTS

EP   0 586 330 A1   7/1993
EP   1 541 070 A1   6/2005
(Continued)

*Primary Examiner* — Reginald L Alexander
(74) *Attorney, Agent, or Firm* — Sughrue Mion, PLLC

(57) ABSTRACT

The system comprises
a data input device (T) for inputting data associated with a supply of cartridges or capsules comprised of a predetermined amount of cartridges or capsules (C), and capable of defining a predetermined reference number related to said amount; and
an electronic monitoring and control module (EM), adapted to be associated with a machine (CM) for preparing beverages of the cartridge or capsule kind, and comprising:
a detector (26) adapted to acquire said data;
at least one controlled switch (22), connectable between the electric pump (10) and the associated control switch (5a) of the machine (CM), such that the electric pump (10) can be activated only when said controlled switch (22) is closed, and can be deactivated if said switch (22) is open;
at least one detection terminal (21a) adapted to be connected to the control switch (5a) associated with the electric pump (10) of the machine (CM), to provide an activation signal each time said control switch (5a) is operated to activate the electric pump (10); and
a processing and control unit (25) predisposed for:
driving the controlled switch (22) to allow the activation of the electric pump (10), each time the processing and control unit (25) receives one activation signal;
counting and storing the number of activations of the electric pump (10) corresponding each to the preparation of a beverage by means of a corresponding cartridge or capsule (C);
comparing said number of activations with the reference number; and
performing a predetermined operation as a function of the result of said comparison.

9 Claims, 3 Drawing Sheets

(51) Int. Cl.
 *A47J 31/52* (2006.01)
 *A47J 31/56* (2006.01)
 *A47J 31/36* (2006.01)

(56) References Cited

U.S. PATENT DOCUMENTS 8,573,116 B2 * 11/2013 Etter et al. ............... 99/288

8,692,165 B2 * 4/2014 Geockner et al. ............. 219/482

FOREIGN PATENT DOCUMENTS

| EP | 1 890 271 A1 | 2/2008 |
| JP | 2009-196684 A | 9/2009 |
| WO | 2005/003022 A1 | 1/2005 |

* cited by examiner

SYSTEM FOR MONITORING AND CONTROLLING MODES OF OPERATION OF A MACHINE FOR PREPARING BEVERAGES, IN PARTICULAR COFFEE, BY MEANS OF CARTRIDGES OR CAPSULES

CROSS REFERENCE TO RELATED APPLICATIONS

This application is a National Stage of International Application No. PCT/IB2011/054924, filed on Nov. 4, 2011, which claims priority from Italian Patent Application No. TO2010A000881, filed on Nov. 5, 2010, the contents of all of which are incorporated herein by reference in their entirety.

The present invention concerns a system for monitoring modes of operation of machines for preparing beverages by means of cartridges or capsules, in particular coffee.

More specifically, the invention relates to a system for monitoring and controlling a machine for preparing beverages, comprising a pair of terminals for connection to a voltage supply source, to which through a control switch an electric pump is connectable to supply a flow of hot water through a cartridge or capsule positioned in the machine to prepare a beverage.

It is an object of the present invention to provide an improved monitoring system which makes it possible to trace and control the quantities and the types of capsules or cartridges consumed by the clients/end users.

This and other objects are achieved according to the invention by a monitoring system comprising
   data input means for inputting data associated with a supply of cartridges or capsules comprised of a predetermined amount of cartridges or capsules, and capable of defining a predetermined reference number related to said amount of cartridges or capsules; and
   electronic monitoring and control means, adapted to be associated with a machine for preparing beverages of the above kind, and comprising:
      detecting means adapted to acquire said data;
      at least one controlled electric switch, connectable between the electric pump and the associated control switch of the machine, such that the electric pump can be activated only when said switch is closed, and can be deactivated if said switch is open;
      at least one detection terminal adapted to be connected to the control switch associated with the electric pump of the machine, to provide an activation signal each time said control switch is operated to activate the electric pump; and
      electronic processing and control means predisposed for:
         driving said controlled switch to allow the activation of the electric pump, each time said electronic processing and control means receive one above-mentioned activation signal;
         counting and storing the number of activations of the electric pump corresponding each to the preparation of a beverage by means of a corresponding cartridge or capsule;
         comparing said number of activations with said reference number; and
         performing at least one predetermined operation as a function of the result of said comparison.

In a currently preferred embodiment, the above-mentioned data input means comprise a transponder, in particular a transponder of the "contactless" type, for example an RFID transponder, which is associated with each individual supply of cartridges or capsules and stores data indicative of the corresponding reference number, and said detecting means comprise a transponder-reader.

The above-mentioned electronic processing and control means can advantageously be predisposed for detecting the duration of each activation of the electric pump of the machine, and for counting and storing only the activations of the electric pump having a duration greater than a predetermined value.

In a specific implementation, it is expedient that the above-mentioned monitoring and control means comprise an electronic module including the transponder-reader, the above-mentioned controlled electric switch and an electronic processing and control unit, said electronic module being installed adjacent to or within the machine, and possibly integrated within the electronics of such a machine.

Further features and advantages of the invention will become apparent from the detailed description which follows, given purely by way of non-restrictive example, with reference to the appended drawings, in which:

FIG. 1 shows, by way of example, a pack or supply P which, in a container PC, comprises a predetermined amount of cartridges or capsules C for preparing a beverage, in particular espresso coffee.

A transponder T, in particular a so-called RFID (Radio-Frequency Identification) tag, denoted by T, is associated with the pack or supply P.

Figure 1:
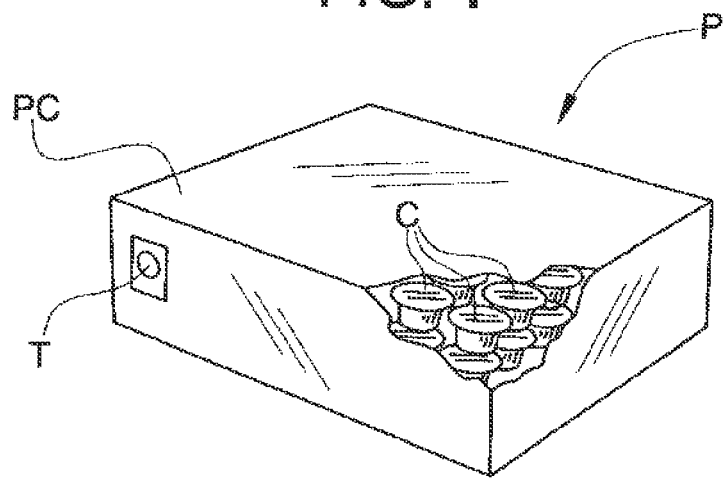
FIG. 1 is a perspective view of a pack or supply of capsules or cartridges, provided with an RFID tag, for use in a system according to the invention.

In the example shown in FIG. 1, the tag T is applied to the container PC, but it could also be supplied separately from said container.

The tag T contains data which define a reference number $N_r$, related to the amount of cartridges or capsules C present in the pack P. By way of example, the number $N_r$ is equal to the number of capsules C in said pack.

It is also possible for further data to be written in the tag T, for example data which identify the type of beverage which can be prepared with the capsules C, such as coffee, decaffeinated coffee and tea, or configuration parameters, etc.

Figure 2:
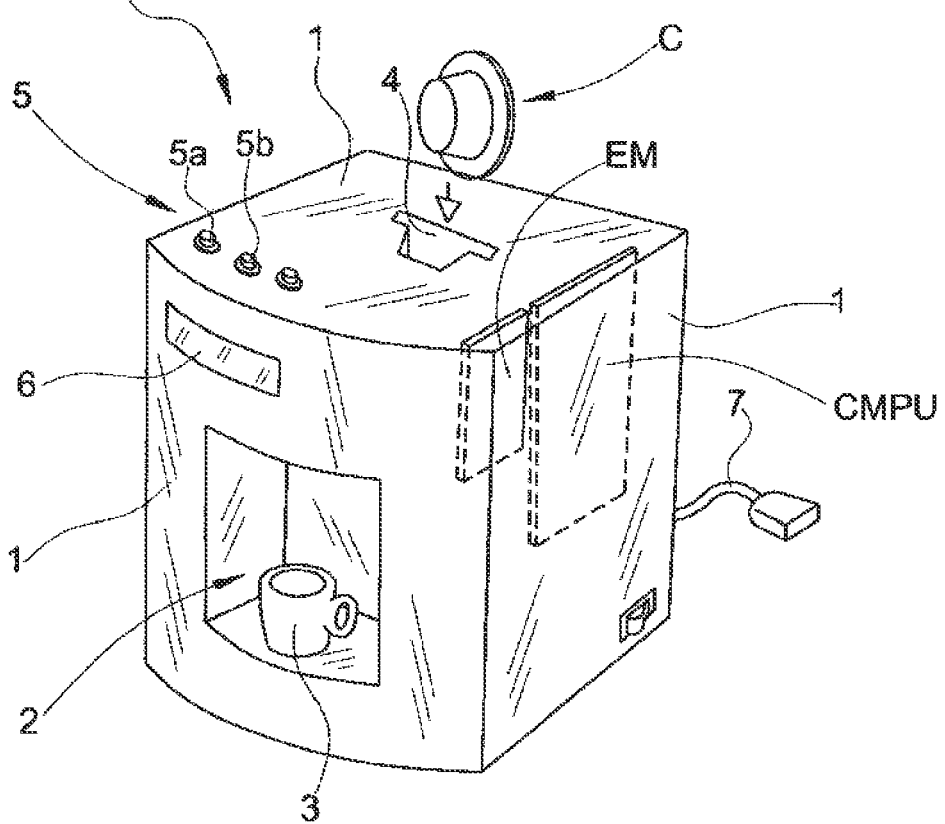
FIG. 2 is a perspective view of a machine for preparing beverages, in particular coffee, to which a system for monitoring and controlling the use according to the present invention is associated.
Figure 3:
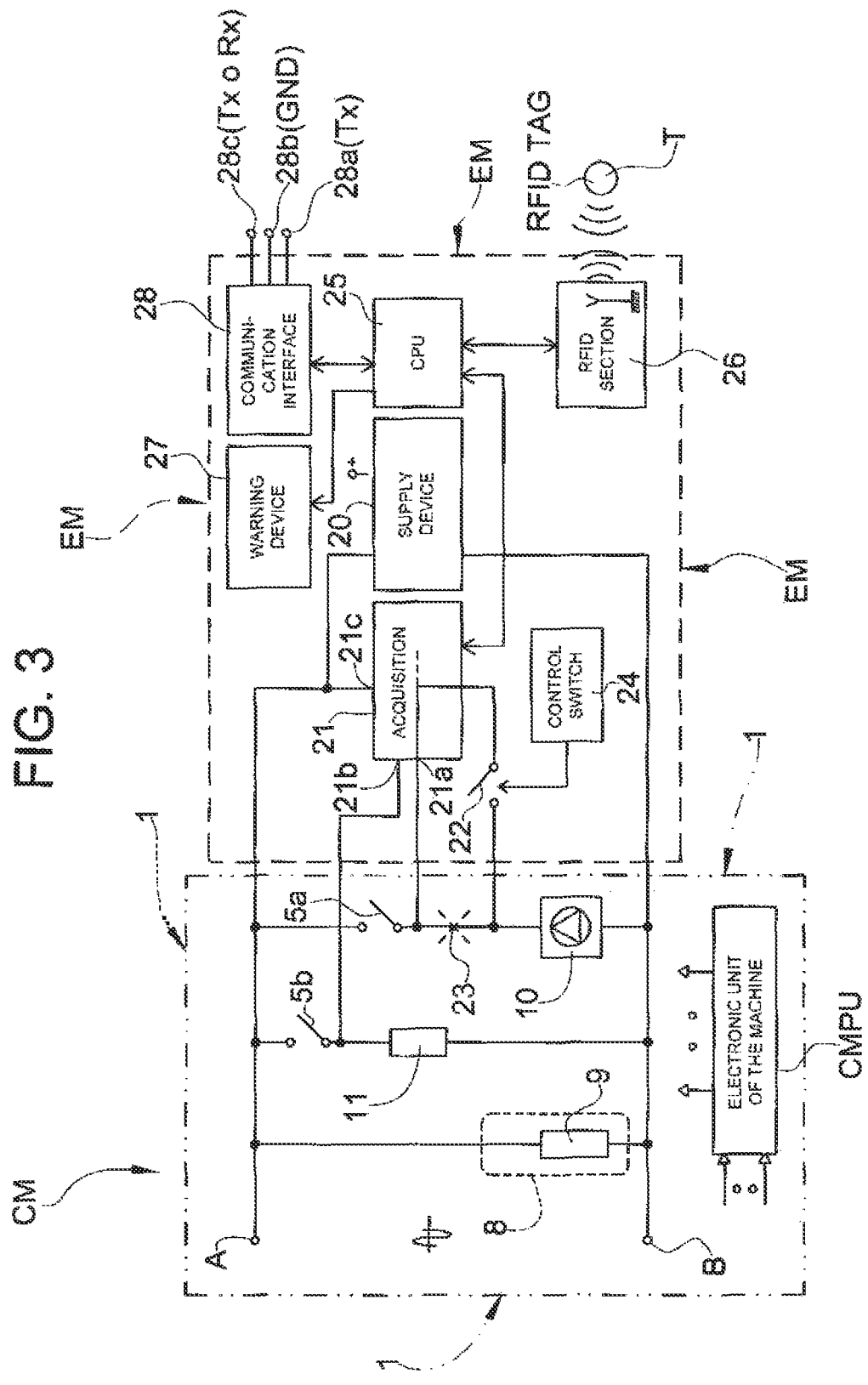
FIG. 3 is an electrical diagram, partly in block form, of the machine and of the associated monitoring and control system shown in FIG. 2.

In FIGS. 2 and 3, CM as a whole denotes a machine for preparing beverages, in particular espresso coffee, using prepacked cartridges or capsules C.

With reference in particular to FIG. 2, and as is known per se, the machine CM comprises a substantially rigid outer casing 1 which, on the front side, has a supply area 2, in which it is possible to position a receptacle, such as a cup 3, intended to receive a supplied beverage, for example espresso coffee.

A prepacked cartridge or capsule C can be introduced into the machine CM through a suitable shaped slot, denoted by 4 in FIG. 1.

The machine CM has a plurality of electric control switches, denoted as a whole by 5, by means of which the user can control the operation of the machine. The latter can also be provided with a display device 6, which can show information to the user.

The machine CM can be fed with electrical power supplied from a source, in particular from the alternating current electricity mains, to which the machine can be connected by means of a cable 7.

In a manner known per se, the machine CM comprises a plurality of electrical devices inside the casing 1, the operation of which devices is controlled by an electronic unit or board, denoted as a whole by CMPU in FIGS. 2 and 3.

With reference to the diagram in FIG. 3, in the exemplary embodiment shown the inside of the casing 1 of the machine CM comprises a boiler 8, which is provided with a heating resistor 9 connected between two terminals A and B for connection to the voltage supply source.

It is possible for an electric pump 10 to be connected to the terminals A and B through a control switch 5*a*, said electric pump being intended during operation to supply a flow of hot water through a cartridge or capsule C prepositioned in an infusion chamber of the machine CM, and possibly pre-pierced, to prepare a beverage.

In the embodiment shown in FIG. 3, the machine CM also comprises an electric valve 11, which can be connected to the supply terminals A and B by means of a second control switch 5*b*, at the same time as the electric pump 10, for delivering a simple flow of hot water, which a user can then use in various ways.

The various electrical devices of the machine CM, and in particular the electric pump 10 and the electric valve 11, are controlled in a manner known per se by the electronic unit CMPU of the machine.

A system according to the present invention for monitoring the modes of operation of the machine CM is associated with the latter.

With reference to FIG. 3, in the embodiment shown by way of example this system comprises an electronic module denoted as a whole by EM.

The electronic module EM, the architecture of which will be described in more detail hereinbelow, can be installed inside the casing 1 of the machine CM, as shown in outline form in FIG. 2, this being done during the production of the machine CM or subsequently as a retrofit device.

The electronic module EM may even be formed integrated in the electronic control unit CMPU of said machine CM.

In further alternative embodiments, which are not shown, the electronic module EM can be physically applied to the outside of the machine CM, in this case too as a primary installation module or as a subsequently added module.

As has already been mentioned above, the system for monitoring and controlling modes of operation of the machine CM according to the invention provides for the use of transponders T, in particular so-called RFID tags, which are associated with the retail packs P of cartridges or capsules C and in which readable information indicative of the amount and possibly of the type of cartridges or capsules C contained therein is stored.

As will become more evident from the text which follows, through the use of such transponders or tags T, the monitoring and control system according to the invention makes it possible to "trace" and control the quantities and the type of cartridges or capsules which are sold/consumed by the end users by means of simple decounting techniques. By way of example, the system thereby makes it possible for the distributors of cartridges or capsules to autonomously manage the distribution logistics and the allocation of possible "credits" in relation to the cartridges or capsules sold to the end clients, and also makes it possible to ensure that it is impossible for the end user to use cartridges or capsules C which have not been authorized by the original manufacturer.

The system also makes it possible to read/transfer data from a group of machines distributed in a certain "field", for carrying out a number of processing and evaluation operations in succession.

The monitoring and control system according to the invention expediently takes advantage of the use of the technology of so-called contactless transponders, in particular of RFID (Radio-Frequency Identification) technology, a technology which makes the automatic identification of electronic devices (so-called tags) possible, which are able to "respond", communicating information written therein beforehand, when they are "interrogated", without this requiring either contact between the reader and the tag or optical-type reading (as is necessary, however, for reading bar codes, for example).

For reading/writing an RFID tag, all that is needed is a read/write apparatus provided with an antenna which can generate an electromagnetic field capable of supplying, by induction, an electronic chip present in the tag. The data stored in the RFID tag and those exchanged with the electronic module EM can expediently be encrypted in ways which are known per se.

The monitoring and control system according to the invention can be operated using an RFID system, operating for example in accordance with the standard ISO 14443 A.

Referring again to FIG. 3, in the embodiment shown therein the electronic module EM comprises a voltage supply device 20, which is connected to the supply terminals A and B of the machine CM and is intended to provide the required continuous supply voltages to the various devices of the module.

The module EM also comprises a reading or acquisition device 21, having a pair of inputs 21*a* and 21*b* connected to the terminals of the switches 5*a* and 5*b* which are connected to the electric pump 10 and to the electric valve 11. A further input 21*c* of the reading or acquisition device 21 can be connected to the supply terminal A of the machine CM.

During operation, the signals to the inputs 21*a* and 21*b* of the reading or acquisition device 21 make it possible to detect if the switches 5*a* and 5*b* are open or closed.

The reading or acquisition device 21 is also connected to the upper terminal of the electric pump 10, by means of a controlled electric switch 22. The layout is such that the controlled switch 22 is connected in parallel with a length of conductor wire 23, which, in the machine CM, connects the switch 5*a* to the electric pump 10. This length 23 is expediently interrupted, as indicated by a cross with broken lines in FIG. 3.

The layout is therefore such that, during operation, the electric pump 10 can be activated only if the switch 5*a* is closed and if the controlled switch 22 is also closed.

The switch 22 is controlled by a control circuit 24 comprised in the electronic module EM.

The module EM also comprises a processing unit (CPU) 25, which is connected to the reading or acquisition device 21 and to the control circuit 24 associated with the switch 22.

The module EM also comprises an RFID read/write (or even just read) device 26, which is provided with a relative antenna and is connected to the CPU control unit 25.

The electronic module EM also includes a warning device 27, for example of the acoustic and/or optical type, and a communication interface 28.

In use, when the user of the machine CM is about to use the first cartridge or capsule C of a pack P, they first have to move the tag T associated with said pack towards the electronic module EM, so as to allow the CPU control unit 25 to acquire the reference number $N_r$ related to the amount of cartridges or capsules C of said pack.

The user can then use the cartridges or capsules C of the pack to prepare corresponding beverages.

Once a capsule C has been introduced into the slot 4 of the machine, the user presses the button of the switch 5a, to start the preparation of the beverage.

The CPU control unit 25 of the electronic module EM is predisposed for detecting the activation of the switch 5a (by means of the signal detected at the input 21a of the reading device 21) and driving the controlled switch 22 closed, in order to allow the activation of the electric pump 10.

The CPU control unit 25 is also predisposed for counting and storing the number of activations of the electric pump 10 corresponding each to the preparation of a beverage by means of a corresponding cartridge or capsule C.

The CPU unit 25 is expediently able to distinguish possible accidental activations of the control switch 5a associated with the electric pump 10, on the basis of the duration of the state of closure of said switch, which is detected by means of the reading or acquisition circuit 21: for this purpose, the CPU unit 25 is predisposed for counting and storing only the activations of the electric pump 10 which have a duration greater than a predetermined value, for example equal to 10 seconds.

Through the reading or acquisition circuit 21, the CPU unit 25 of the electronic module is also able to detect and count the simultaneous activations of the electric valve 11 and of the electric pump 10, corresponding to simple hot water deliveries and not to the preparation of true and actual beverages. In this case, too, in order to avoid incorrect counting of brief accidental activations of the electric valve 11, the CPU unit 25 is expediently predisposed for counting and storing only the activations which have a duration greater than a predetermined value, in this case too equal to about 10 seconds.

On the basis of the tallies thereby made and stored, the CPU unit 25 is able in particular to carry out decounting starting from the reference number $N_r$ read in the tag T of the pack P during use. On the basis of the comparison between the decounting value reached and the reference number $N_2$, the CPU unit 25 can then carry out one or more predetermined operations, as will be described in more detail hereinbelow.

The CPU unit 25 can be predisposed in particular for generating a first information signal, for example for the activation of the warning device 27, when the difference between said reference number and the number of counted beverage deliveries is equal to or lower than a first predetermined value, for example corresponding to 10 beverages. Such signalling is useful to the user of the machine CM in that it allows them to replenish the machine with cartridges or capsules before they have completely exhausted those still available.

The CPU unit 25 can also be expediently predisposed for generating a second electric information signal, for example for the activation of the warning device 27 in a different way, and/or for blocking the operation of the electric pump 10 of the machine CM when the difference between said reference number and the number of counted beverage deliveries of the electric pump 10 is zero.

In this case, the user is prompted to replenish the machine with "original" cartridges or capsules so as to be able to re-establish the functionality of the machine CM.

Figure 4:
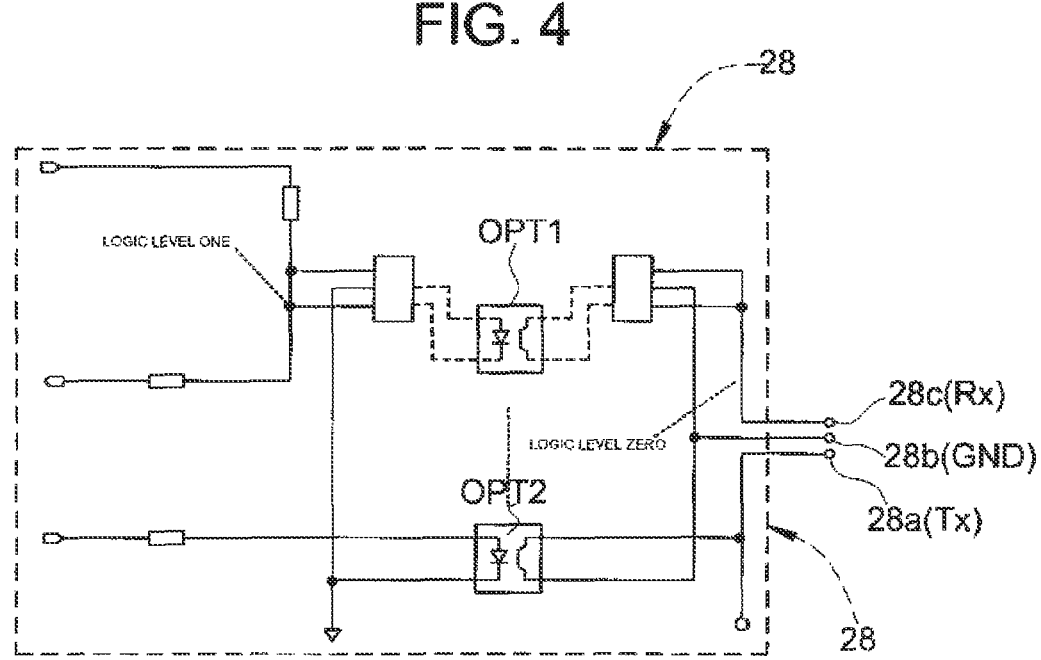
FIGS. 4 and 5 are circuit diagrams showing two different configurations of a communication interface comprised in a monitoring and control system according to the present invention.
Figure 5:
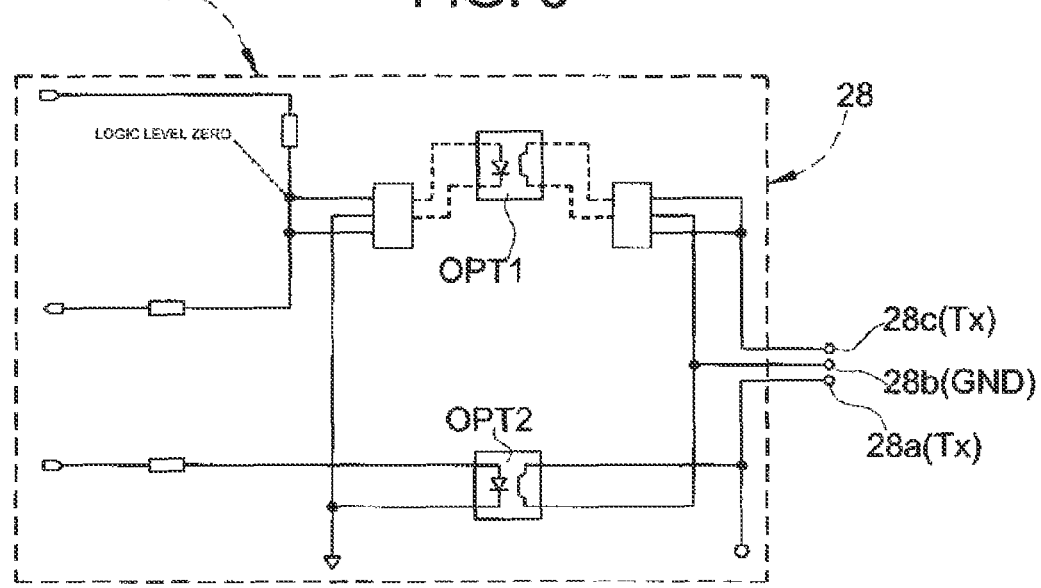

For the possible use in association with machines CMPU provided with an own electronic control unit having an interface for the communication of data from/towards the outside, the electronic module EM can expediently also be provided with its own data communication interface, such as that denoted by 28 in FIGS. 3 to 5. This communication interface 28 is preferably of an opto-isolated kind, capable of operating at least in transmission (TX) and connectable to the communication interface of the electronic control unit CMPU of the machine CM by means of a cable, for example a tripolar cable, comprising two conductors for serial communication in transmission (TX) or reception (RX), and a ground conductor (GND).

With reference to FIG. 3, the communication interface 28 shown therein has three terminals 28a, 28b, 28c, respectively of transmission (TX), for connection to ground (GND) and of transmission (TX) or reception (RX).

The communication interface 28 can expediently be formed as shown in FIGS. 4 and 5.

The circuit architecture shown in FIG. 4 is that of an interface having a terminal 28c which is a reception terminal (RX).

The circuit architectures in FIGS. 4 and 5 comprise exactly the same components, and in particular two opto-isolators OPT1 and OPT2. These differ only in the different way in which the opto-isolator OPT1 is connected.

Owing to this feature, the communication interface 28 of the electronic module EM of FIG. 3 can be made compatible with two different types of communication interfaces of the electronic control unit of the machine CM simply by modifying the way in which the opto-isolator OPT1 is inserted.

The electronic module EM described above can be formed in such a way that it can be reconfigured/reprogrammed by means of a transponder.

Clearly, without departing from the principle of the invention, the embodiments and details of construction may vary considerably from those described and illustrated purely by way of non-restrictive example, without thereby departing from the scope of the invention as defined in the accompanying claims.

The invention claimed is:

1. A system for monitoring and controlling modes of operation of a machine (CM) for preparing beverages by means of cartridges or capsules (C), in particular coffee, the machine (CM) comprising a pair of terminals (A, B) for connection to a voltage supply source, to which through a control switch (5a) an electric pump (10) is connectable to supply a flow of hot water through a cartridge or capsule (C) positioned in the machine (CM) to prepare a beverage;

the system comprising data input means (T) for inputting data associated with a supply of cartridges or capsules comprised of a predetermined amount of cartridges or capsules (C), and capable of defining a predetermined reference number related to said amount of cartridges or capsules (C); and electronic monitoring and control means (EM), adapted to be associated with the machine (CM), and comprising:
detecting means (26) adapted to acquire said data;
at least one controlled switch (22), connectable between the electric pump (10) and the associated control switch (5a) of the machine (CM), such that the electric pump (10) can be activated only when said controlled switch (22) is closed, and can be deactivated if said switch (22) is open;
at least one detection terminal (21a) adapted to be connected to the control switch (5a) associated with the electric pump (10) of the machine (CM), to provide an activation signal each time said control switch (5a) is operated to activate the electric pump (10); and
electronic processing and control means (25) predisposed for
driving said controlled switch (22) to allow the activation of the electric pump (10), each time said electronic processing and control means (25) receive one above-mentioned activation signal;

counting and storing the number of activations of the electric pump (10) corresponding each to the preparation of a beverage by means of a corresponding cartridge or capsule (C);

comparing said number of activations with said reference number; and performing at least one predetermined operation as a function of the result of said comparison, wherein, for a simple delivery of a flow of hot water, to said supply terminals (A, B) also an electric valve (11) can be connected, by means of an associated second control switch (5b), besides the electric pump (10), and wherein said processing and control means (21, 25) have a further detection terminal (21b) adapted to be coupled to said second control switch (5a) of the machine (CM) to provide a second activation signal each time said second switch (5b) is operated to activate said electric valve (11).

2. A system according to claim 1, wherein said electronic processing and control means (25) are predisposed for detecting the duration of each activation of the electric pump (10) of the machine (CM).

3. A system according to claim 1, wherein said electronic processing and control means (25) are predisposed for detecting the duration of each simultaneous activation of the electric pump (10) and said electric valve (11) and for counting only the simultaneous activations having a duration greater than a predetermined value.

4. A system according to claim 1, wherein said data input means comprise a transponder (T), in particular of the RFID type, adapted to store readable data indicative of said reference number, and wherein said detecting means (26) comprise a transponder-reader (26).

5. A system according to claim 1, wherein said monitoring and control means comprise an electronic module (EM) installed adjacent or within the machine (CM), or integrated in an electronic control unit (CMPU) of the machine (CM), and including said detecting means (26), said controlled switch (22) and an electronic processing and control unit (25).

6. A system according to claim 1, wherein said electronic processing and control means (25) are predisposed for generating first electric information signals when the difference between said reference number and the number of counted activations of the electric pump (10) alone is equal to or lower than a first predetermined value.

7. A system according to claim 6, wherein said electronic processing and control means (25) are predisposed for generating second electric information signals or electric disabling signals capable of preventing the operation of the electric pump (10) of the machine (CM), when the difference between said reference number and the number of counted activations of the sole electric pump (10) of the machine (CM) becomes equal to zero.

8. A system according to claim 5, for use in association with machines (CM) provided with an own electronic control unit (CMPU) having an interface for the communication of data toward the outside, said electronic module (EM) comprising its own data communication interface (28), preferably of an opto-isolated kind, capable of operating at least in transmission and connectable to the communication interface of the electronic control unit of the machine (CM).

9. A system according to claim 8, for use with a machine (CM) having an electronic unit (CMPU) provided with a communication interface of a first kind provided with two receiving terminals, or with a communication interface of a second kind having a transmission terminal and a reception terminal, and wherein the communication interface (28) of said electronic module (EM) comprises an electronic device or component (OPT1) which can be selectively connected either in a first or in a second manner to cause the interface (28) of the electronic module (EM) to assume a first or a second configuration, compatible with said interface of the first kind and with said interface of the second kind, respectively.

* * * * *